(12) United States Patent
Reed et al.

(10) Patent No.: US 10,831,165 B2
(45) Date of Patent: Nov. 10, 2020

(54) SYSTEM AND METHOD FOR REPLACING 16-PIN ECM MOTOR WITH NON-16-PIN FIELD ADJUSTABLE ECM MOTOR

(71) Applicant: Nidec Motor Corporation, St. Louis, MO (US)

(72) Inventors: Tarris A. Reed, St. Charles, MO (US); Christopher D. Schock, O'Fallon, MO (US); Ryan Timothy Wade, O'Fallon, MO (US); Morgan Jeremy Silvey, St. Peters, MO (US); Prakash B. Shahi, St. Louis, MO (US); Robert J. Ploof, Jr., Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 16/375,482

(22) Filed: Apr. 4, 2019

(65) Prior Publication Data
US 2020/0319612 A1 Oct. 8, 2020

(51) Int. Cl.
*G05B 19/042* (2006.01)

(52) U.S. Cl.
CPC .... *G05B 19/042* (2013.01); *G05B 2219/2614* (2013.01)

(58) Field of Classification Search
CPC ............... G05B 19/042; G05B 2219/2614
See application file for complete search history.

(56) References Cited

U.S. PATENT DOCUMENTS

| | | | | |
|---|---|---|---|---|
| 2004/0232872 | A1* | 11/2004 | Sunaga | B60H 1/00857 318/652 |
| 2007/0016340 | A1* | 1/2007 | Soudier | H02P 29/0241 701/1 |
| 2014/0336838 | A1* | 11/2014 | Yon | G01R 21/133 700/297 |
| 2014/0379098 | A1* | 12/2014 | Masten | G05B 19/042 700/19 |
| 2020/0088434 | A1* | 3/2020 | Diaz | G08C 17/02 |

* cited by examiner

*Primary Examiner* — Ziaul Karim
(74) *Attorney, Agent, or Firm* — Hovey Williams LLP

(57) ABSTRACT

A system and method for replacing a sixteen-pin ECM with a non-sixteen-pin, field adjustable ECM in an HVAC or other system, and adjusting the performance of the replacement motor at the point of installation. A converter module receives programming information from an existing control board via an existing sixteen-pin harness, and converts the information to six signals. The module includes potentiometers for tuning speed/torque for first and second settings, adjusting a horsepower output of the replacement ECM, and adjusting a ramp time to increase or decrease a rate at which the speed/torque changes. The module includes switches for selecting between clockwise and counterclockwise directions for the replacement ECM, selecting between PWM and non-PWM control, and selecting between torque and speed modes. A non-sixteen-pin motor controller receives the information from the converter module via a four-wire harness, translates the information, and outputs a control signal to the replacement ECM.

40 Claims, 5 Drawing Sheets

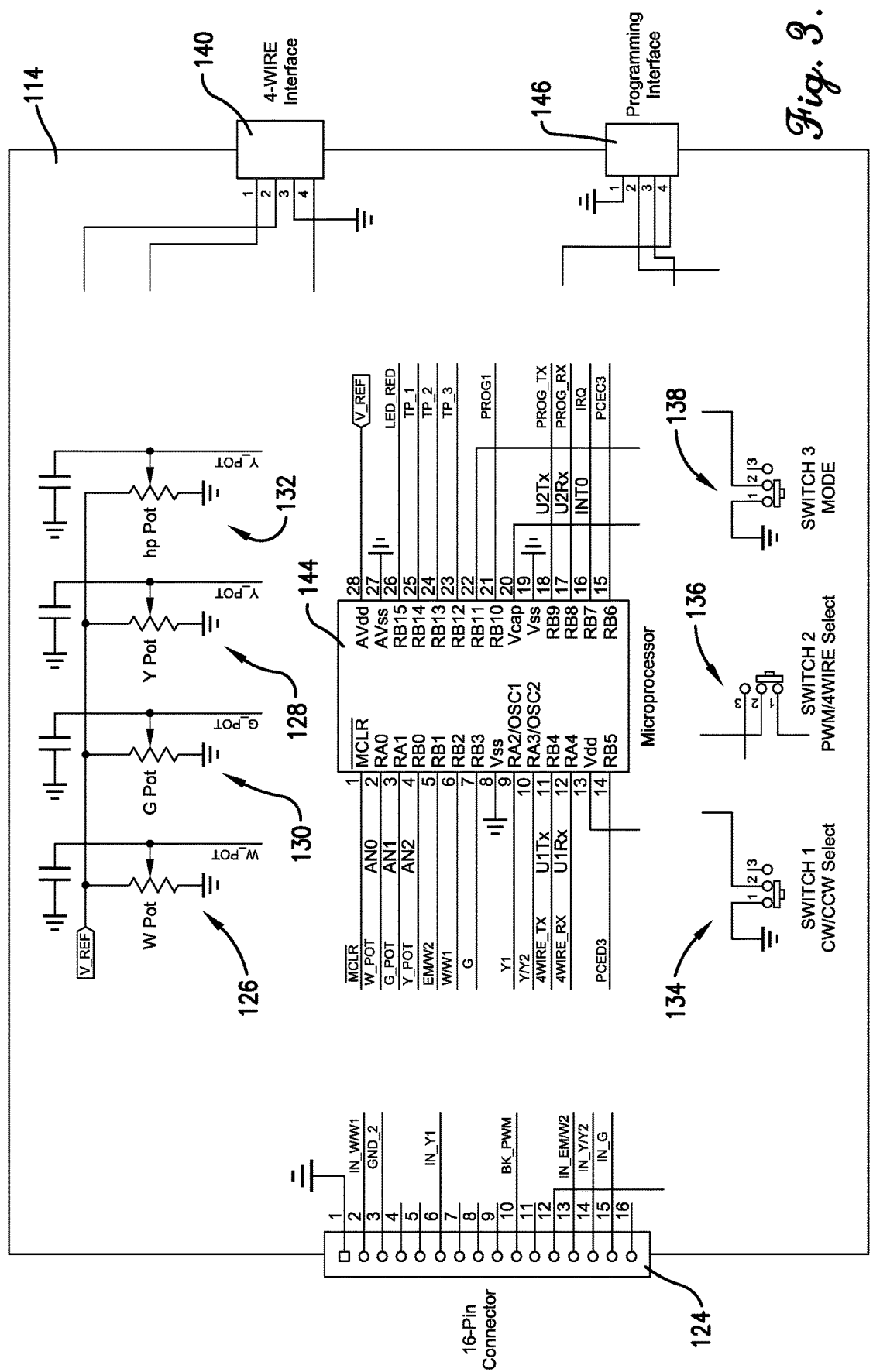

SYSTEM AND METHOD FOR REPLACING 16-PIN ECM MOTOR WITH NON-16-PIN FIELD ADJUSTABLE ECM MOTOR

FIELD

The present disclosure relates to systems and methods for replacing electric motors in heating, ventilation, and/or air-conditioning systems or other applications, and more particularly, embodiments concern a system and method for replacing a sixteen-pin electronically commutated motor with a non-sixteen-pin electronically commutated motor in a heating, ventilation, and/or air-conditioning system or other application, and adjusting the performance of the replacement motor at the point of installation.

BACKGROUND

In a heating, ventilation, and air conditioning (HVAC) system, an electronically commutated motor (ECM) is a variable speed electric motor configured to maintain a programmed rate of airflow (CFM) in response to changes in torque. When the torque changes, the speed (RPM) of the electric motor is either ramped up or ramped down to maintain the programmed CFM. Referring to FIG. 1, a typical ECM system 10 includes a control board 12 and an ECM 14. The ECM 14 conventionally is a 16-pin ECM motor which includes an ECM motor 16 and motor controller 18. The motor 16 drives a blower fan 20. The typical ECM system 10 is pre-programed wherein the control board 12 is used to set a desired CFM for a particular application, and based on the desired CFM, the control board 12 outputs programming information via a sixteen-pin harness 22. In one implementation, the control board 12 has an internal look-up table of CFMs, and most of the sixteen pins are used to specify a corresponding parameter such as, for example, speed/torque, airflow, and temperature. The ECM motor controller 18 receives the programming information from the control board 12 via the sixteen-pin harness 22, translates the programming information based on a known relationship between RPM, torque, and CFM, and outputs a control signal to the ECM motor 16 to produce the desired CFM. The ECM 14 drives the blower fan 20 in accordance with the control signal. The control signal can be a controlled voltage or current at a given frequency.

In the HVAC market, ECMs are becoming a more popular choice for replacing original equipment manufacturer (OEM) motors. ECMs offer some advantages over other motor technologies, but the sixteen-pin connection can introduce significant limitations. In particular, ECMs provide a broader range of flexibility and comfort options over alternative replacement motors such as permanent split capacitor (PSC) motors. Since the sixteen-pin technology is complex and burdensome to replace, failed sixteen-pin ECMs are often replaced with less desirable PSC motors with speed control. As a result, the end-user suffers decreased efficiency and airflow performance. The cost of OEM replacement is particularly high because there is no viable alternative replacement, and in some cases it may be preferable to replace the entire furnace than to replace the sixteen-pin ECM.

This background discussion is intended to provide information related to the present invention which is not necessarily prior art.

SUMMARY

Embodiments address the above-described and other problems and limitations in the prior art by providing a system and method for replacing a sixteen-pin ECM with a non-sixteen-pin ECM in an HVAC system or other application, and adjusting the performance of the replacement motor at the point of installation.

In a first embodiment of the present invention, a system is provided for replacing a sixteen-pin ECM with a non-sixteen-pin ECM in a particular application. The particular application may include an existing control board configured to allow for setting a desired operating condition and to output corresponding programming information via an existing sixteen-pin harness. The system may include a converter module configured to receive the programming information from the existing control board via the existing sixteen-pin harness, convert the programming information to between five and seven signals. The converter module may include a first potentiometer configured to allow for tuning a speed/torque for a first setting between no more than plus and minus twenty percent of a default first setting value, and a second potentiometer configured to allow for tuning a speed/torque for a second setting between no more than plus and minus twenty percent of a default second setting value. The converter module may be further configured to send the five to seven signals via a reduced-wire harness to a non-sixteen-pin motor controller configured to translate the programming information based on a known relationship between speed, torque, and the operating condition, and based thereon, output a control signal to the non-sixteen-pin electronically commutated motor. In one implementation, the particular application may be an HVAC application, the operating condition may be an air flow, the first setting may be a heat setting, and the second setting may be a cool setting.

In a second embodiment, a system is provided for replacing a sixteen-pin ECM with a non-sixteen-pin ECM in a particular application. The particular application may include an existing control board configured to allow for setting a desired air flow and to output corresponding programming information via an existing sixteen-pin harness. The system may include a converter module, a non-sixteen-pin motor controller, and a non-sixteen-pin ECM. The converter module may be configured to receive the programming information from the existing control board via the existing sixteen-pin harness, convert the programming information to between five and seven signals. The converter module may include a first potentiometer configured to allow for tuning a speed/torque for a heat setting between no more than plus and minus twenty percent of a default heat setting value, and a second potentiometer configured to allow for tuning a speed/torque for a cool setting between no more than plus and minus twenty percent of a default cool setting value. The non-sixteen-pin motor controller may be configured to receive the programming information from the converter module via a reduced-wire harness, translate the programming information based on a known relationship between speed, torque, and air flow, and based thereon, output a control signal to create the desired air flow. The non-sixteen-pin ECM may be configured to receive and operate in accordance with the control signal to create the desired air flow.

In a third embodiment, a method is provided for replacing a sixteen-pin ECM with a non-sixteen-pin ECM in a particular application. The particular application may include an existing control board configured to allow for setting a desired air flow and to output corresponding programming information via an existing sixteen-pin harness. The method may include the following steps. The existing sixteen-pin harness may be disconnected from an existing sixteen-pin motor controller, and the existing sixteen-pin motor controller and an existing ECM motor may be removed. A replacement non-sixteen-pin motor controller with a replacement ECM motor may be installed in place of the existing sixteen-pin motor controller and the existing sixteen-pin ECM which were removed. The existing sixteen-pin harness from the existing control board may be connected to a sixteen-pin connector of a converter module, and a reduced-wire harness may be connected from the converter module to the replacement non-sixteen-pin motor controller. A potentiometer associated with the converter module may be adjusted, including adjusting a first potentiometer to tune a speed/torque for a heat setting between no more than plus and minus twenty percent of a default heat setting value, and adjusting a second potentiometer to tune a speed/torque for a cool setting between no more than plus and minus twenty percent of a default cool setting value.

Various implementations of the foregoing embodiments may include any one or more of the following additional features. The converter module may convert the programming information to six signals, and the reduced-wire harness may communicate the six signals over four wires. The converter module may further include a third potentiometer configured to allow for adjusting a horsepower output of the non-sixteen-pin motor, and/or a fourth potentiometer configured to allow for adjusting a ramp time to increase or decrease a rate at which the speed/torque changes. The converter module may further include a first switch configured to allow for selecting between a clockwise direction and a counterclockwise direction for the non-sixteen-pin motor, a second switch configured to allow for selecting between a pulse-width-modulation control and non-pulse-width-modulation control for the non-sixteen-pin motor, and/or a third switch configured to allow for selecting between a torque mode and a speed mode for the non-sixteen-pin motor.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 3 is a schematic of an implementation of the converter module of FIG. 2A or 2B, showing several electronic components;

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a system and method for replacing a sixteen-pin ECM with a field adjustable ECM in an HVAC system or other application, and tuning or adjusting the performance of the replacement motor at the point of installation. The field adjustable ECM can include a non-sixteen-pin ECM. Moreover, in one implementation, sixteen original signals from an existing control board may be reduced to between five and seven (for example, six) useful signals which are input into an ECM motor controller and used to control an ECM. More specifically, embodiments emphasize basic function pins, and run a default speed/torque which a technician is able to tune or adjust in the field during installation and/or maintenance. Thus, embodiments advantageously provide a universal solution for more quickly, efficiently, and cost-effectively replacing sixteen-pin ECMs with non-sixteen-pin ECMs which are adjustable at the point of installation, and thereby reduce the burden on technicians tasked with replacing failed motors while maintaining higher efficiency for end-users. More particularly, the embodiments provide the same or similar connections as the sixteen-pin ECM to minimize any technician apprehension of replacing the sixteen-pin ECM. Applications for the present technology may broadly include residential or commercial furnace or air handlers; heating and ventilation applications; fan coils, package terminal units, heat pumps, and air conditioners; evaporation units; pump motors; etc.

Figure 1:
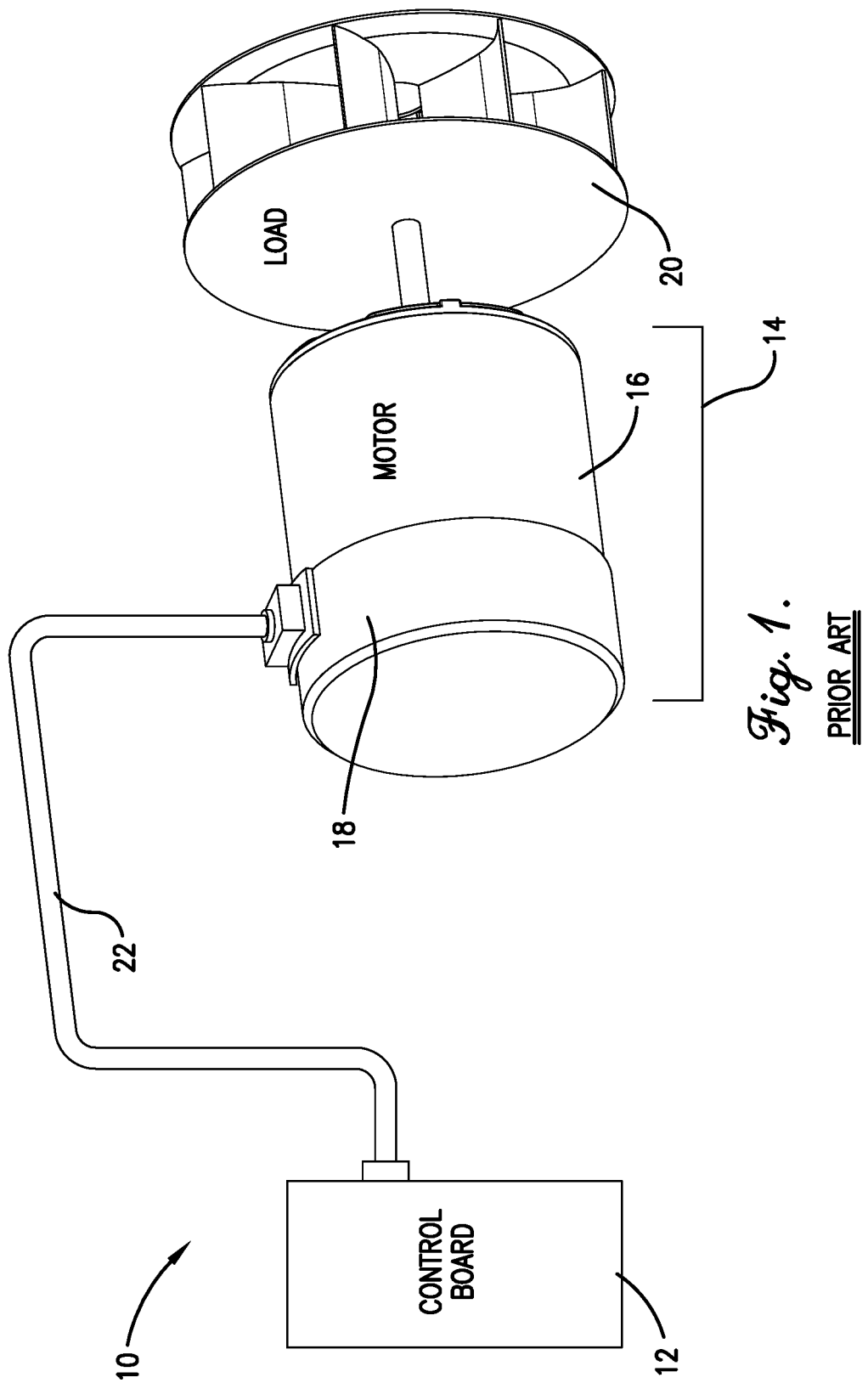
FIG. 1 is a schematic of a conventional system including a sixteen-pin ECM.
Figure 2A:
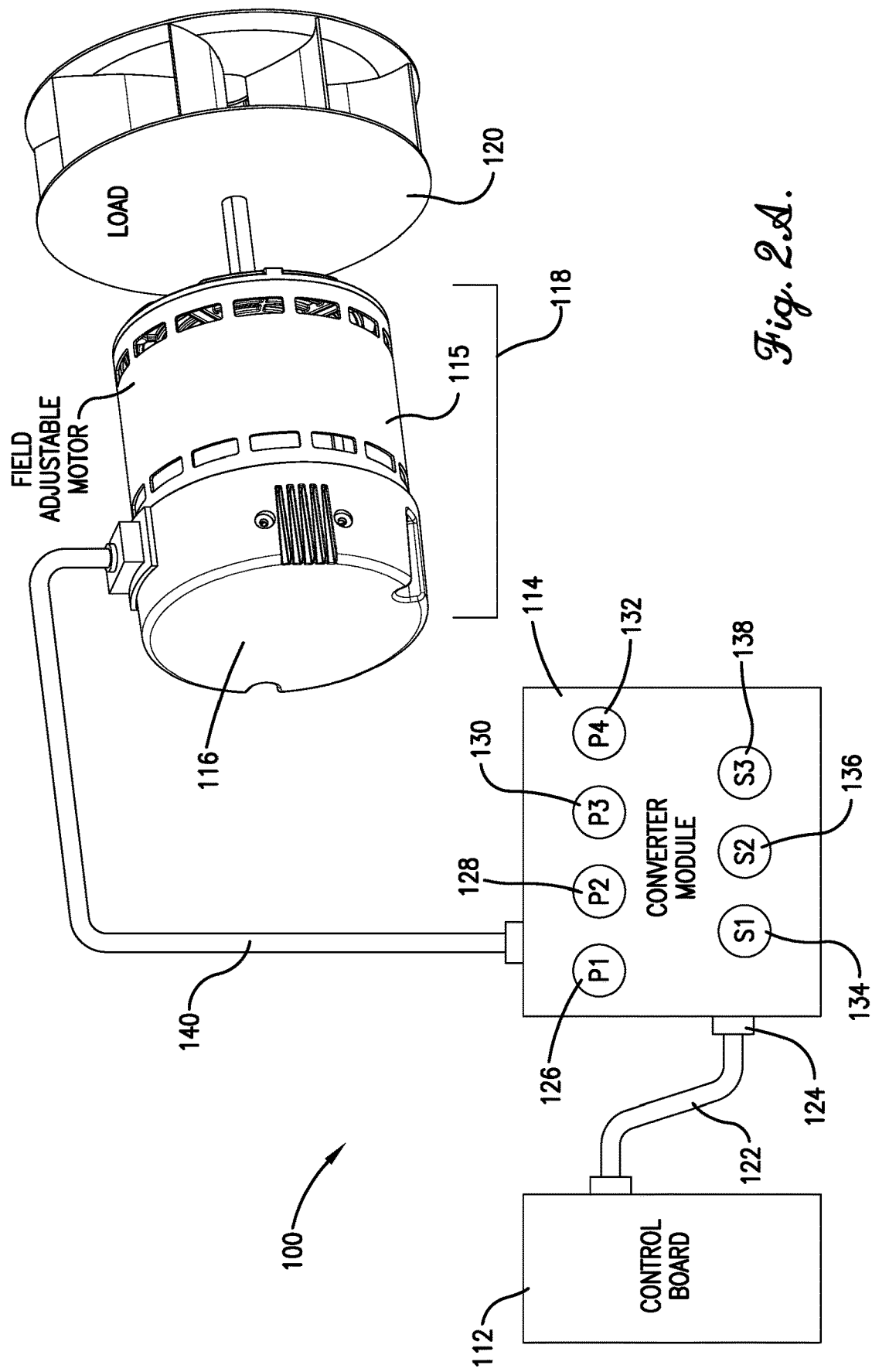
FIG. 2A is a schematic of an embodiment of a system in which an existing sixteen-pin ECM of FIG. 1 has been replaced with a non-sixteen-pin, field adjustable ECM and an external converter module.
Figure 2B:
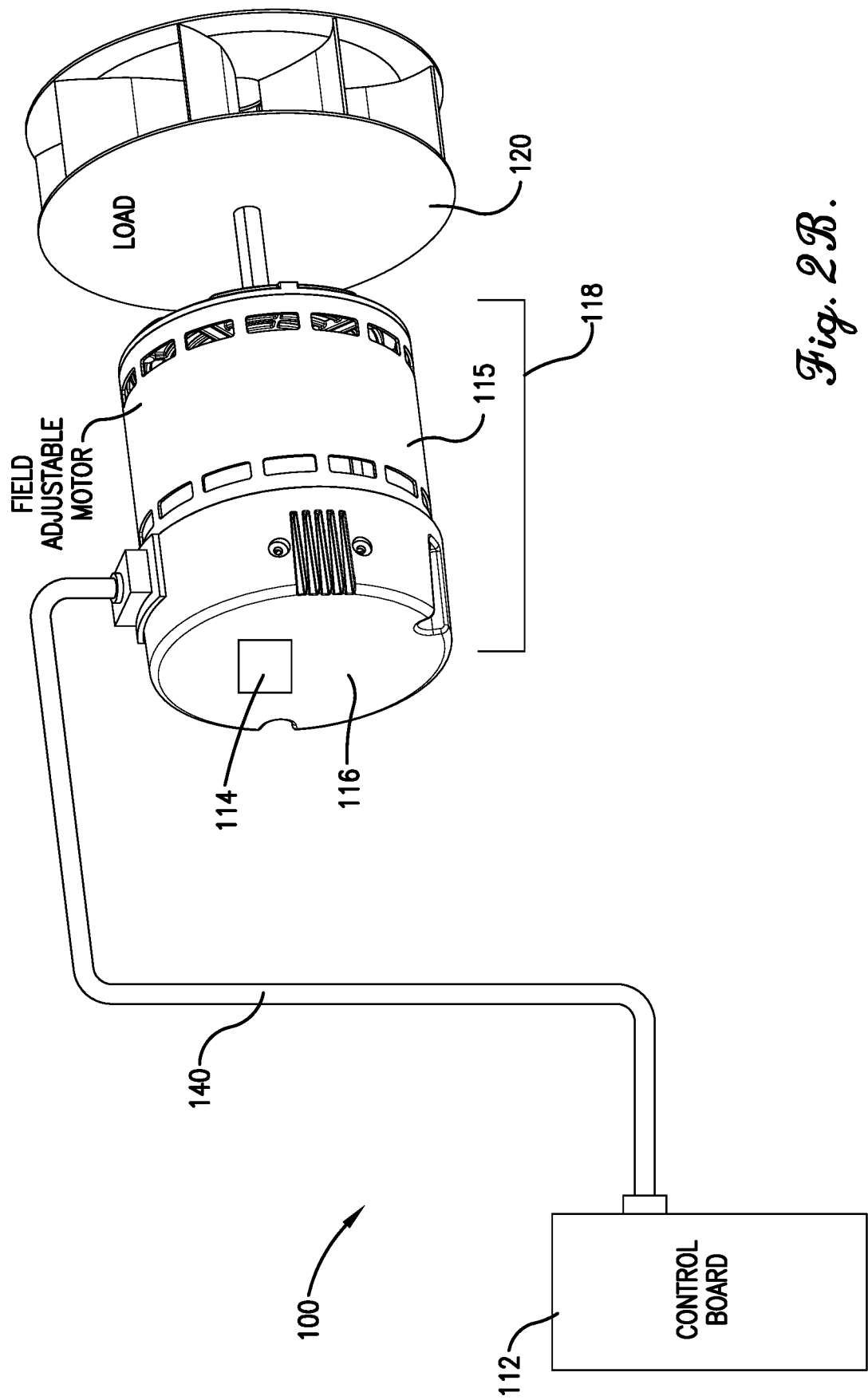
FIG. 2B is a schematic of an embodiment of a system in which an existing sixteen-pin ECM of FIG. 1 has been replaced with a non-sixteen-pin, field adjustable ECM and an internal converter module.

Referring to FIGS. 2A, 2B and 3, an embodiment of a system 100 is shown in which an existing sixteen-pin ECM (such as is shown in FIG. 1) has been replaced with a non-sixteen-pin, field adjustable ECM and a converter module. Broadly, the system 100 and an example operating context may include an existing control board 112, a converter module 114 and a replacement non-sixteen-pin ECM 118. The ECM 118 includes a field adjustable motor 115 and a motor controller 116. The field adjustable motor 115 drives a load 120 (which may be, for example, a blower fan, pump impeller, etc.). As shown in FIG. 2A, the converter module 114 includes an external device relative to the motor controller 116. As shown in FIG. 2B, the converter module 114 includes an internal or embedded device relative to the motor controller 116. The existing control board 112 may be configured to allow for setting a desired CFM for a particular application, and based on the desired CFM, the control board 112 may output programming information via a sixteen-pin harness 122. In one implementation, the existing control board may be a conventional sixteen-pin furnace/air handler board for an HVAC system.

The converter module 114 may be configured to receive the programming information from the existing control board 112 via the sixteen-pin harness 122, convert the programming information to a reduced number of signals, such as between five and seven (for example, six) signals, and output the reduced number of signals on a reduced number of wires, such as between three and five (for example, four) wires, to the replacement non-sixteen-pin ECM motor controller 116. In one implementation, the converter module 114 may include a sixteen-pin standard connector 124 configured to connect to the sixteen-pin harness 122 from the control board 112; receive various (for example, heat, cool, and fan thermostat) programming signals; decipher the programming signals using hardware or software; calculate or look-up the corresponding desired CFM; and output a control signal for achieving the desired CFM. The converter module 114 may be a stand-alone device or may be attached to or integrated into the replacement non-sixteen-pin ECM motor controller 116. In one implementation, the converter module 114 may include all of the same physical connections which are used with sixteen-pin ECMs, which may reduce the apprehension of technicians tasked with installing replacement non-sixteen-pin ECMs.

In one implementation, with reference to an existing standard converter module, the removed input signals may include O, Cool1/Cool2, Heat1/Heat2, Adjust1/Adjust2, Delay1/Delay2, and the removed output signal may include Out, and the retained input signals may have the same circuitry and component values as the prior art standard, and may include W1, W2, Y1, Y2, G, PWM, COM, 24 VAC. In one implementation, some or all of the inputs may be provided with a Schottky diode, close to the uC ports, for additional protection. These diodes may be used to prevent uC port voltages above 3.3V+0.3V and below −0.3V.

The converter module 114 may include one or more potentiometers or other similarly suitable adjustment mechanisms configured to allow for adjusting the operation of the replacement non-sixteen-pin ECM 118 at the point of installation. A first potentiometer 126 may allow for tuning a speed/torque for the first (for example, heat) setting W1/W2 from a default first setting value. A second potentiometer 128 may allow for tuning a speed/torque for the second (for example, cool) setting Y1/Y2 from a default second setting value. In each case, the speed/torque may be tunable approximately between no more than (i.e., up to) plus and minus twenty percent, or between no more than plus and minus ten percent, from the default setting. The tuning process may involve measuring voltages on the potentiometer wiper using a uC internal analog-to-digital (A/D) converter. G speed/torque selection may be a percentage of the Y1/Y2 selection. A third potentiometer 130 may allow for adjusting a horsepower (hp) output of the replacement non-sixteen-pin ECM 118, thereby allowing for turning a standard one hp motor into a three-quarter or one-half or one third hp motor. The adjustment process may involve measuring a voltage on the signal pin connected to the switch using the uC internal A/D converter. A fourth potentiometer 132 may allow for adjusting a ramp time to increase or decrease a rate at which the speed/torque changes.

One or more of the potentiometers may be connected to analog ground and analog supply/reference voltage (Vref), which is the supply for the analog section of the uC and reference voltage for the A/D converter, thereby minimizing an influence of a change in Vref on the A/D value. One or more of the potentiometers may be provided with a filtering capacitor. One or more of the potentiometers may be mounted flush to a top or other accessible surface of the converter module 114. One or more of the potentiometers may be adjustable using a suitable tool (for example, a flat screwdriver) and/or adjustable using a software application on a smartphone or other mobile communications and/or computing device which communicates with the converter module 114 via a wired or wireless communication protocol (for example, Bluetooth®).

The converter module 114 may include one or more switches or other similarly suitable adjustment mechanisms configured to allow for adjusting the operation of the replacement non-sixteen-pin ECM 118 at the point of installation. A first switch 134 may allow for selecting a direction, either clockwise or counterclockwise, of the replacement non-sixteen-pin ECM 118, thereby allowing for using a standard motor in different mounting configurations. A second switch 136 may allow for selecting between pulse-width-modulation (PWM) and non-PWM, thereby accommodating air handlers that use PWM to control the motor. This allows for passing a BK/PWM signal straight to the motor RX pin when a PWM signal is activate on the sixteen-pin connector 124. In effect, the second switch 136 either enables or disables the converter module 114. A third switch 138 may allow for selecting between a torque mode and a speed mode on which to base the process for achieving the desired CFM. One or more of the switches may be mounted flush to an accessible surface of the converter module 114. One or more of the switches may be adjustable using a suitable tool (for example, a flat screwdriver) and/or adjustable using a software application on a smartphone or other mobile communications and/or computing device which communicates with the converter module 114 via a wired or wireless communication protocol (for example, Bluetooth).

As shown in FIG. 3, the converter module 114 may include an electronic microprocessor 144 executing a computer program for determining the speed/torque and ramp time default values. In one implementation, these default values may be provided in a look-up table. The look-up table may require the mode setting from the third switch 138, and the hp setting from the third potentiometer 130. For example, if the third switch 138 is set to speed mode, and the third potentiometer 130 is set to one hp, then the default value for the heat setting may be 600 RPM and the default value for the cool setting may be 800 RPM. In the same example, if the third switch 138 is set to torque mode, then the default value for the heat setting may be 23 lb-in and the default value for the cool setting may be 23 lb-in. In another example, if the third switch 138 is set to speed mode, and the third potentiometer 130 is set to one-half hp, then the default value for the heat setting may be 600 RPM and the default value for the cool setting may be 800 RPM. In the same example, if the third switch 138 is set to torque mode, then the default value for the heat setting may be 13 lb-in and the default value for the cool setting may be 13 lb-in. Given these default values, the actual output values may then be adjustable using the potentiometers, as described herein. Further, the converter module 114 may include a programming interface 146 configured to facilitate changing these default values and/or otherwise programming the operation of the microprocessor 144. A graphical user interface may further facilitate changing the default values and/or otherwise programming the microprocessor 144.

The replacement non-sixteen-pin ECM motor controller 116 may be configured to receive the reduced number signals (for example, six signals) from the converter module 114 via a reduced number of wires harness 140 (for example, a four wire harness), translate the programming information based on a known relationship between RPM, torque, and CFM, and based thereon, output a control signal to produce the desired CFM. The replacement non-sixteen-pin ECM converter module 114 may be located on the replacement non-sixteen-pin ECM 118, or may be remotely located relative to and in wired or wireless communication with a motor controller component of the replacement non-sixteen-pin ECM 118. The replacement non-sixteen-pin ECM 118 may be configured to receive the control signal from the replacement non-sixteen-pin ECM converter module 114, and to operate in accordance with the control signal to drive the load 120. In one implementation, the replacement non-sixteen-pin ECM 118 may be a PerfectSpeed® motor available from Nidec Motor Corporation. More particularly, the converter module 114 will connect with the replacement non-sixteen-pin ECM 118, such as for example, the PerfectSpeed® motor, read signals such as heat, cool, and fan thermostat signals and run the replacement non-sixteen-pin ECM 118 at a predetermined torque demand. The potentiometers 126, 128, 130, and 132 can be used to adjust or adjust the torque demand in each of the as heat, cool, and fan thermostat settings.

Figure 4:
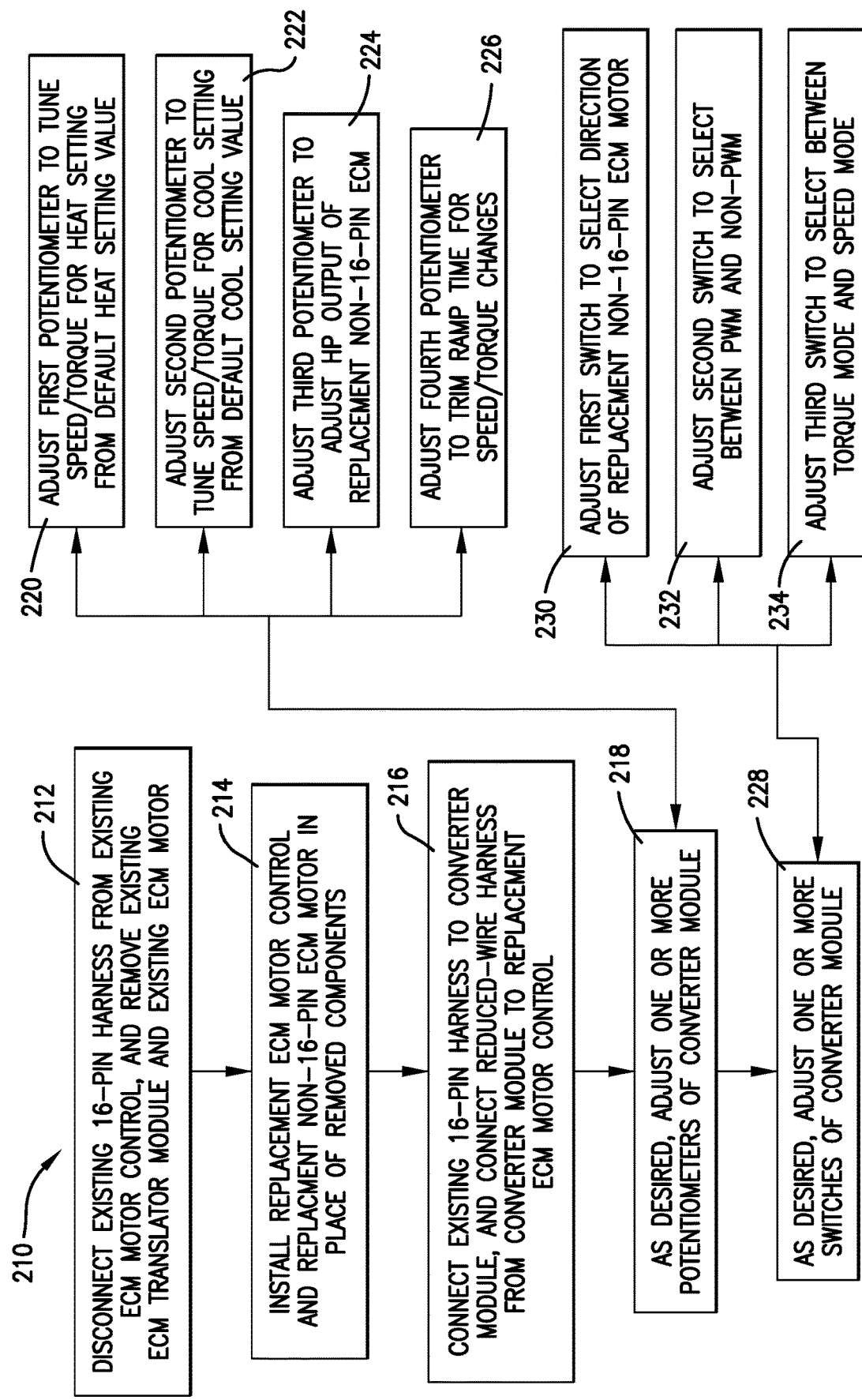
FIG. 4 is a flowchart of an embodiment of a method for replacing an existing sixteen-pin ECM with a non-sixteen-pin, field adjustable ECM and a converter module.

Referring also to FIG. 4, an embodiment of a method 210 is shown for replacing an existing sixteen-pin ECM (as seen in FIG. 1) with a field adjustable ECM such as, for example, a non-sixteen-pin ECM and a converter module (as seen in FIGS. 2 and 3) in an HVAC or other application. An existing sixteen-pin harness 122 connecting an existing sixteen-pin ECM motor controller to an existing control board 112 may be disconnected from the existing sixteen-pin ECM motor controller, and the existing sixteen-pin ECM motor controller and an existing sixteen-pin ECM may be removed, as shown in 212. A replacement non-sixteen-pin ECM motor controller 116 and a replacement non-sixteen-pin ECM 118 may be installed in place of the removed components, as shown in 214. The existing sixteen-pin harness 122 from the control board 112 may be connected to a sixteen-pin connector 124 of a converter module 114, and a reduced-wire harness 140 from the converter module 114 may be connected to the replacement non-sixteen-pin ECM motor controller 116, as shown in 216.

As desired, one or more potentiometers or similarly suitable adjustment mechanisms associated with the converter module 114 may be adjusted, as shown in 218. For example, a first potentiometer 126 may be adjusted to tune a speed/torque for a first (for example, heat) setting W1/W2 from a default first setting value, as shown in 220. A second potentiometer 128 may be adjusted to tune a speed/torque for a second (for example, cool) setting Y1/Y2 from a default second setting value, as shown in 222. In each case, the speed/torque may be tunable approximately between no more than plus and minus twenty percent, or between no more than plus and minus ten percent, from the default setting. The tuning process may involve measuring voltages on the potentiometer wiper using a uC internal A/D converter. G speed/torque selection may be a percentage of the Y1/Y2 selection. A third potentiometer 130 may be adjusted to adjust a hp output of the replacement non-sixteen-pin ECM 118, as shown in 224, thereby turning a standard one hp motor into a three-quarter or one-half hp motor. The adjustment process may involve measuring a voltage on the signal pin connected to the switch using the uC internal A/D converter. A fourth potentiometer 132 may be adjusted to adjust a ramp time to increase or decrease a rate at which the speed/torque changes, as shown in 226. As desired, one or more switches or similarly suitable adjustment mechanisms associated with the converter module 114 may be adjusted, as shown in 228. For example, a first switch 134 may be adjusted to select a direction, either clockwise or counter-clockwise, of the replacement non-sixteen-pin ECM 118, as shown in 230, thereby allowing for using a standard motor in different mounting configurations. A second switch 136 may be adjusted to select between PWM and non-PWM, as shown in 232, thereby accommodating air handlers that use PWM to control the motor. A third switch 138 may be adjusted to select between a torque mode and a speed mode on which to base the process for achieving the desired CFM, as shown in 234.

Once any such adjustments have been made, the existing sixteen-pin ECM 16 will have been successfully replaced with the replacement non-sixteen-pin ECM 118 for driving a blower fan, pump impeller, or other load 120, depending on the application. Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for replacing a sixteen-pin electronically commutated motor with a non-sixteen-pin electronically commutated motor in a particular application, the particular application including an existing control board configured to allow for setting a desired operating condition and to output corresponding programming information via an existing sixteen-pin harness, the system comprising:
    a converter module configured to receive the programming information from the existing control board via the existing sixteen-pin harness, convert the programming information to between five and seven signals, wherein the converter module includes—
        a first potentiometer configured to allow for tuning a speed for a first setting between no more than plus and minus twenty percent of a default first setting value, and
        a second potentiometer configured to allow for tuning a speed for a second setting between no more than plus and minus twenty percent of a default second setting value; and
    the converter module further configured to send the five to seven signals via a reduced-wire harness to a non-sixteen-pin motor controller configured to translate the programming information based on a known relationship between speed, torque, and the operating condition, and based thereon, output a control signal to the non-sixteen-pin electronically commutated motor.

2. The system of claim 1, wherein the particular application is a heating, ventilation, and cooling application, the operating condition is an air flow, the first setting is a heat setting, and the second setting is a cool setting.

3. The system of claim 1, wherein the converter module converts the programming information to six signals, and the reduced-wire harness communicates the six signals over four wires.

4. The system of claim 1, wherein the converter module further includes a third potentiometer configured to allow for adjusting a horsepower output of the non-sixteen-pin electronically commutated motor.

5. The system of claim 1, wherein the converter module further includes a fourth potentiometer configured to allow for adjusting a ramp time to increase or decrease a rate at which the speed changes.

6. The system of claim 1, wherein the converter module further includes a first switch configured to allow for selecting a between a clockwise direction and a counterclockwise direction for the non-sixteen-pin electronically commutated motor.

7. The system of claim 1, wherein the converter module further includes a second switch configured to allow for selecting between a pulse-width-modulation control and non-pulse-width-modulation control for the non-sixteen-pin electronically commutated motor.

8. The system of claim 1, wherein the converter module further includes a third switch configured to allow for selecting between a torque mode and a speed mode for the non-sixteen-pin electronically commutated motor.

9. A system for replacing a sixteen-pin electronically commutated motor with a non-sixteen-pin electronically commutated motor in a particular application, the particular application including an existing control board configured to allow for setting a desired air flow and to output corresponding programming information via an existing sixteen-pin harness, the system comprising:
a converter module configured to receive the programming information from the existing control board via the existing sixteen-pin harness, convert the programming information to between five and seven signals, wherein the converter module includes—
a first potentiometer configured to allow for tuning a speed for a heat setting between no more than plus and minus twenty percent of a default heat setting value, and
a second potentiometer configured to allow for tuning a speed for a cool setting between no more than plus and minus twenty percent of a default cool setting value;
a non-sixteen-pin motor controller configured to receive the programming information from the converter module via a reduced-wire harness, translate the programming information based on a known relationship between speed, torque, and air flow, and based thereon, output a control signal to create the desired air flow; and
the non-sixteen-pin electronically commutated motor configured to receive and operate in accordance with the control signal to create the desired air flow.

10. The system of claim 9, wherein the converter module further includes a third potentiometer configured to allow for adjusting a horsepower output of the non-sixteen-pin electronically commutated motor.

11. The system of claim 9, wherein the converter module further includes a fourth potentiometer configured to allow for adjusting a ramp time to increase or decrease a rate at which the speed changes.

12. The system of claim 9, wherein the converter module further includes a first switch configured to allow for selecting a between a clockwise direction and a counterclockwise direction for the non-sixteen-pin electronically commutated motor.

13. The system of claim 9, wherein the converter module further includes a second switch configured to allow for selecting between a pulse-width-modulation control and non-pulse-width-modulation control for the non-sixteen-pin electronically commutated motor.

14. The system of claim 9, wherein the converter module further includes a third switch configured to allow for selecting between a torque mode and a speed mode for the non-sixteen-pin electronically commutated motor.

15. A method for replacing a sixteen-pin electronically commutated motor with a non-sixteen-pin electronically commutated motor in a particular application, the particular application including an existing control board configured to allow for setting a desired air flow and to output corresponding programming information via an existing sixteen-pin harness, the method comprising:
disconnecting the existing sixteen-pin harness from an existing sixteen-pin motor controller, and removing the existing sixteen-pin motor controller and an existing sixteen-pin electronically commutated motor;
installing a replacement non-sixteen-pin motor controller and a replacement non-sixteen-pin electronically commutated motor in place of the existing sixteen-pin motor controller and the existing sixteen-pin electronically commutated motor which were removed;
connecting the existing sixteen-pin harness from the existing control board to a sixteen-pin connector of a converter module, and connecting a reduced-wire harness from the converter module to the replacement non-sixteen-pin motor controller; and
adjusting a potentiometer associated with the converter module, including—
adjusting a first potentiometer to tune a speed for a heat setting between no more than plus and minus twenty percent of a default heat setting value, and
adjusting a second potentiometer to tune a speed for a cool setting between no more than plus and minus twenty percent of a default cool setting value.

16. The method of claim 15, further including adjusting a third potentiometer to adjust a horsepower output of the non-sixteen-pin electronically commutated motor.

17. The method of claim 15, further including adjusting a fourth potentiometer to adjust a ramp time to increase or decrease a rate at which the speed changes.

18. The method of claim 15, further including adjusting a first switch associated with the converter module to select between a clockwise direction and a counterclockwise direction for the non-sixteen-pin electronically commutated motor.

19. The method of claim 15, further including adjusting a second switch associated with the converter module to select between a pulse-width-modulation control and non-pulse-width-modulation control for the non-sixteen-pin electronically commutated motor.

20. The method of claim 15, further including adjusting a third switch associated with the converter module to select between a torque mode and a speed mode for the non-sixteen-pin electronically commutated motor.

21. A system for replacing a sixteen-pin electronically commutated motor with a non-sixteen-pin electronically commutated motor in a particular application, the particular application including an existing control board configured to allow for setting a desired operating condition and to output corresponding programming information via an existing sixteen-pin harness, the system comprising:
a converter module configured to receive the programming information from the existing control board via the existing sixteen-pin harness, convert the programming information to between five and seven signals, wherein the converter module includes— a first potentiometer configured to allow for tuning a torque for a first setting between no more than plus and minus twenty percent of a default first setting value, and a second potentiometer configured to allow for tuning a torque for a second setting between no more than plus and minus twenty percent of a default second setting value; and the converter module further configured to send the five to seven signals via a reduced-wire harness to a non-sixteen-pin motor controller configured to translate the programming information based on a known relationship between speed, torque, and the operating condition, and based thereon, output a control signal to the non-sixteen-pin electronically commutated motor.

22. The system of claim 21, wherein the particular application is a heating, ventilation, and cooling application, the operating condition is an air flow, the first setting is a heat setting, and the second setting is a cool setting.

23. The system of claim 21, wherein the converter module converts the programming information to six signals, and the reduced-wire harness communicates the six signals over four wires.

24. The system of claim 21, wherein the converter module further includes a third potentiometer configured to allow for adjusting a horsepower output of the non-sixteen-pin electronically commutated motor.

25. The system of claim 21, wherein the converter module further includes a fourth potentiometer configured to allow for adjusting a ramp time to increase or decrease a rate at which the torque changes.

26. The system of claim 21, wherein the converter module further includes a first switch configured to allow for selecting a between a clockwise direction and a counterclockwise direction for the non-sixteen-pin electronically commutated motor.

27. The system of claim 21, wherein the converter module further includes a second switch configured to allow for selecting between a pulse-width-modulation control and non-pulse-width-modulation control for the non-sixteen-pin electronically commutated motor.

28. The system of claim 1, wherein the converter module further includes a third switch configured to allow for selecting between a torque mode and a speed mode for the non-sixteen-pin electronically commutated motor.

29. A system for replacing a sixteen-pin electronically commutated motor with a non-sixteen-pin electronically commutated motor in a particular application, the particular application including an existing control board configured to allow for setting a desired air flow and to output corresponding programming information via an existing sixteen-pin harness, the system comprising:

a converter module configured to receive the programming information from the existing control board via the existing sixteen-pin harness, convert the programming information to between five and seven signals, wherein the converter module includes— a first potentiometer configured to allow for tuning a torque for a heat setting between no more than plus and minus twenty percent of a default heat setting value, and a second potentiometer configured to allow for tuning a torque for a cool setting between no more than plus and minus twenty percent of a default cool setting value;

a non-sixteen-pin motor controller configured to receive the programming information from the converter module via a reduced-wire harness, translate the programming information based on a known relationship between speed, torque, and air flow, and based thereon, output a control signal to create the desired air flow; and the non-sixteen-pin electronically commutated motor configured to receive and operate in accordance with the control signal to create the desired air flow.

30. The system of claim 29, wherein the converter module further includes a third potentiometer configured to allow for adjusting a horsepower output of the non-sixteen-pin electronically commutated motor.

31. The system of claim 29, wherein the converter module further includes a fourth potentiometer configured to allow for adjusting a ramp time to increase or decrease a rate at which the torque changes.

32. The system of claim 29, wherein the converter module further includes a first switch configured to allow for selecting a between a clockwise direction and a counterclockwise direction for the non-sixteen-pin electronically commutated motor.

33. The system of claim 29, wherein the converter module further includes a second switch configured to allow for selecting between a pulse-width-modulation control and non-pulse-width-modulation control for the non-sixteen-pin electronically commutated motor.

34. The system of claim 29, wherein the converter module further includes a third switch configured to allow for selecting between a torque mode and a speed mode for the non-sixteen-pin electronically commutated motor.

35. A method for replacing a sixteen-pin electronically commutated motor with a non-sixteen-pin electronically commutated motor in a particular application, the particular application including an existing control board configured to allow for setting a desired air flow and to output corresponding programming information via an existing sixteen-pin harness, the method comprising:

disconnecting the existing sixteen-pin harness from an existing sixteen-pin motor controller, and removing the existing sixteen-pin motor controller and an existing sixteen-pin electronically commutated motor;

installing a replacement non-sixteen-pin motor controller and a replacement non-sixteen-pin electronically commutated motor in place of the existing sixteen-pin motor controller and the existing sixteen-pin electronically commutated motor which were removed;

connecting the existing sixteen-pin harness from the existing control board to a sixteen-pin connector of a converter module, and connecting a reduced-wire harness from the converter module to the replacement non-sixteen-pin motor controller; and adjusting a potentiometer associated with the converter module, including— adjusting a first potentiometer to tune a torque for a heat setting between no more than plus and minus twenty percent of a default heat setting value, and adjusting a second potentiometer to tune a torque for a cool setting between no more than plus and minus twenty percent of a default cool setting value.

36. The method of claim 35, further including adjusting a third potentiometer to adjust a horsepower output of the non-sixteen-pin electronically commutated motor.

37. The method of claim 35, further including adjusting a fourth potentiometer to adjust a ramp time to increase or decrease a rate at which the torque changes.

38. The method of claim 35, further including adjusting a first switch associated with the converter module to select between a clockwise direction and a counterclockwise direction for the non-sixteen-pin electronically commutated motor.

39. The method of claim 35, further including adjusting a second switch associated with the converter module to select between a pulse-width-modulation control and non-pulse-width-modulation control for the non-sixteen-pin electronically commutated motor.

40. The method of claim 35, further including adjusting a third switch associated with the converter module to select between a torque mode and a speed mode for the non-sixteen-pin electronically commutated motor.

* * * * *